United States Patent
Van Pey et al.

(10) Patent No.: US 11,345,823 B2
(45) Date of Patent: *May 31, 2022

(54) METHOD FOR MODIFYING A CASTING RESIN AND/OR COATING COMPOSITION

(71) Applicant: CLiQ SwissTech B.V., Groningen (NL)

(72) Inventors: Detlef Van Pey, Bergisch Gladbach (DE); René Stèphan Bouwman, Heerenveen (NL); Daniel Haveman, Steenwijk (NL)

(73) Assignee: CLiQ SwissTech B.V., Groningen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/031,156

(22) Filed: Sep. 24, 2020

(65) Prior Publication Data

US 2021/0087410 A1    Mar. 25, 2021

Related U.S. Application Data

(63) Continuation-in-part of application No. 16/185,680, filed on Nov. 9, 2018, now Pat. No. 10,808,132.

(51) Int. Cl.

| | |
|---|---|
| C09D 5/04 | (2006.01) |
| C09D 4/06 | (2006.01) |
| C09D 133/12 | (2006.01) |
| C08G 18/10 | (2006.01) |
| C08G 18/22 | (2006.01) |
| C08G 18/48 | (2006.01) |
| C08G 18/32 | (2006.01) |
| C08G 18/66 | (2006.01) |
| C08G 18/76 | (2006.01) |
| C08K 5/21 | (2006.01) |
| C08K 5/205 | (2006.01) |

(52) U.S. Cl.
CPC ............... *C09D 5/04* (2013.01); *C08G 18/10* (2013.01); *C08G 18/225* (2013.01); *C08G 18/324* (2013.01); *C08G 18/4837* (2013.01); *C08G 18/4845* (2013.01); *C08G 18/6685* (2013.01); *C08G 18/7621* (2013.01); *C08K 5/205* (2013.01); *C08K 5/21* (2013.01); *C09D 4/06* (2013.01); *C09D 133/12* (2013.01)

(58) Field of Classification Search
CPC ... C09D 5/04; C09D 4/06; C08G 2/00–16/06; C08K 5/205; C08K 5/21
See application file for complete search history.

(56) References Cited

U.S. PATENT DOCUMENTS

| | | |
|---|---|---|
| 3,499,858 A | 3/1970 | Strassel |
| 4,314,924 A | 2/1982 | Haubennestel et al. |
| 5,109,061 A | 4/1992 | Speranza |
| 6,617,468 B2 | 9/2003 | Haubenmestel |
| 6,727,320 B2* | 4/2004 | Attarwala ............. A45D 40/04 525/167 |
| 7,408,010 B1 | 8/2008 | Patel |
| 9,617,371 B2 | 4/2017 | Leutfeld et al. |
| 2004/0127674 A1* | 7/2004 | Haubennestel .... C08G 18/6208 528/61 |
| 2007/0259120 A1 | 11/2007 | Haubennestel et al. |
| 2018/0312623 A1* | 11/2018 | Wang .................. C08G 18/244 |
| 2019/0390011 A1 | 12/2019 | Nagelsdiek et al. |

FOREIGN PATENT DOCUMENTS

| | | |
|---|---|---|
| DE | 2822908 B1 | 7/1979 |
| EP | 1048681 A2 | 11/2000 |
| EP | 1048681 B1 | 6/2002 |
| WO | 2018/138236 A1 | 8/2018 |

* cited by examiner

*Primary Examiner* — Marc S Zimmer

(74) *Attorney, Agent, or Firm* — Dilworth & Barrese, LLP

(57) ABSTRACT

Suggested is a method for modifying the rheology of a casting resin and/or coating composition, comprising the following steps: providing a composition comprising at least one monomer capable of forming a casting resin or coating upon polymerisation; and adding to said composition a working amount of a urea urethane obtained under specific conditions as a thixotropic agent.

13 Claims, 7 Drawing Sheets

METHOD FOR MODIFYING A CASTING RESIN AND/OR COATING COMPOSITION

FIELD OF INVENTION

The present invention concerns the area of polymers is related to a method for modifying rheology of a casting resin and/or coating composition.

TECHNOLOGICAL BACKGROUND

Particularly within the field of casting resins, which are used for various purposes, it is necessary to tailor the rheological properties of such compositions. Setting the desired consistency in such compositions is customarily accomplished through appropriate selection of binders, solvents, and the amount of pigments and/or fillers. In many cases, however, setting the desired consistency by means of the aforementioned constituents is not enough. In such cases, the addition of what are called rheological additives or thixotropic agents is required. Their effect may be a reduction in viscosity to aid workability, or an increase in viscosity, the latter also being referred to as thickening. An increase in viscosity of this kind may be achieved, for example, through the addition of thixotropic agents as thickeners.

For the stated applications, a large number of different organic or inorganic thickeners are described: In aqueous systems, it is primarily cellulose ethers, starch, natural hydrocolloids, synthetic biopolymers, polyacrylate thickeners, associative thickeners based on hydrophobically modified polymers such as polyethers, ether urethanes, polyacrylamides, and alkali-activated acrylate emulsions, or water-swellable inorganic thickeners that are used. Typical thickeners for non-aqueous systems, besides organic thickeners such as waxes and thixotropic resins, are inorganic thickeners such as magnesium oxide and magnesium hydroxide, for example, which are used primarily in unsaturated polyester resin systems, or amorphous silicas and phyllosilicates such as organically modified bentonite. In the aqueous systems, and especially non-aqueous systems, that are to be thickened, these thickeners develop their viscosity-increasing effect immediately after incorporation and/or mixing.

Where, for example, amorphous silica is used as a thixotropic agent in a liquid or dispersion in order to produce a thickening effect within said liquid or dispersion, hydrogen bonds may be formed between the individual silica molecules. This produces a three-dimensional network, thereby possibly reducing the fluidity of the liquid or dispersion. A network of this kind can be destroyed again by exposure to shearing forces, leading in turn to a reduction in viscosity of the liquid or dispersion. After a certain regeneration time, the viscosity of the system climbs again, since the silica molecules present in the liquid or dispersion once again form a three-dimensional network. This time-dependent and reversible process is generally referred to as thixotropy.

The thixotropic effect of thixotropic agents such as amorphous silica, for example, is utilized in order, for example, to prevent the sagging or running of resin solutions, sealing compounds, adhesives, coating materials, filling compounds, and casting resins, but also in order to give a more viscous consistency to mineral oils, for example.

In certain systems, the thixotropic agent used, such as amorphous silica, for example, has a tendency to settle. This is particularly critical if systems of this kind containing thixotropic agent are transported over a relatively long time in containers and so are subject to mechanical loads such as shearing forces occurring. Customarily an attempt is made to counteract this unwanted behaviour on the part of the thixotropic agent by increasing the amount of agent used, in order thus to ensure the maintenance of the thixotropic effect, such as the retention of a three-dimensional network, formed by hydrogen bonds between silica molecules, even under at least minor mechanical load. However, increasing the amount used of the thixotropic agent in this way within the respective system often has the disadvantage that too high a concentration can lead to disruptions in certain technical applications of the systems, possibly leading, for example, to unwanted matting effects in the case of lustrously formulated coating systems, or else to a reduction in strength in resin systems. Moreover, such an increase in the amount of thixotropic agent used is particularly deleterious, or is not possible, in systems inherently having a relatively high viscosity.

In systems of these kinds in particular, therefore, the amount of thixotropic agent that can be used is fairly limited.

In some systems containing thixotropic agents, such as, for example, in a system which as well as the thixotropic agent such as amorphous silica also comprises an epoxy resin-based binder, and is admixed with a curing component such as an amine, for example, there may be (competing) formation of hydrogen bonds between the amine and the thixotropic agent such as amorphous silica—other words, there may be adsorption of the added curing component to the thixotropic agent. As a result, the three-dimensional network formed beforehand by hydrogen bonds between the individual silica molecules may be at least partly destroyed, and hence, in particular, the thixotropic effect of the thixotropic agent used may be significantly weakened.

One approach which aims to prevent any such at least partial destruction of such networks in systems containing thixotropic agents, and/or aims to boost the thixotropic effect of the thixotropic agent used, lies in the strengthening or stabilizing of the network within the systems through addition of a thixotropy-increasing additive.

RELEVANT STATE OF THE ART

Thus, for example, DE 3706860 A1 discloses thixotropy-increasing additives based on polyhydroxycarboxamides, which in combination with fumed silica, in solvent-borne systems, improve the incorporation of the silica and increase and stabilize its thixotropic behaviour. These polyhydroxycarboxamides, however, have certain disadvantages in some binder compositions, as for example in epoxy resin-based binders. A disadvantage of the thixotropy-increasing additives known from DE 37 06 860 A1, though, is that their thixotropy-increasing effect is not enough, especially in compositions which are applied at high layer thicknesses, and that where amines are used as a curing component in these compositions, the thixotropy-increasing effect of these additives may be significantly weakened.

Reaction products of an alkyd resin and a poly(ester) amide as thixotropic agents are known from WO 1999 023177 A1. The poly(ester)amide here may be obtained by reaction of a polycarboxylic acid with an amine. The amine in that case is necessarily an aromatic amine, i.e., an amine which is not capable of forming imidazoline and/or tetra-hydropyrimidine units. However, the document contains neither any reference to a use of the poly(ester)amide per se as a thixotropic agent, nor to a use of this polymer or of the reaction product as a thixotropy-increasing additive. In accordance with this teaching, a thixotropic effect is provided exclusively by the reaction product of the alkyd resin and the poly(ester)amide.

Moreover, the addition of a high molecular weight polyethyleneimine as thixotropy-increasing additive with a molecular weight of about 750 000 g/mol is described in EP 0835910 A1. The usefulness of this thixotropy-increasing additive is confined, however, to epoxy resin-based binder systems. A disadvantage of the high molecular weight polyethyleneimines, however, is that on account of their high polarity they have a high viscosity and are difficult to process and/or are of only limited or zero compatibility with many customarily employed binders. Moreover, the high molecular weight polyethyleneimines are used customarily in the form of an aqueous composition, this, however, being deleterious for the majority of solvent-containing compositions, since water may act catalytically and, especially in the case of polyurethane-based binders, there may be unwanted formation of gas. Furthermore, in polyester-based binders in particular, the storage stability of the high molecular weight polyethyleneimines is low.

EP 2970696 B1 (BYK) describes condensation products obtained by reacting at least one polymerized fatty acid or at least one reaction product of at least two polymerized fatty acids and at least one polyamine having at least two primary amino groups with at least one polyalkylene polyamine for the same purpose. The thixotropic agents provide a sufficient primary viscosity to a casted resin; however, viscosity is found not being stable over the time, particularly at elevated temperatures.

Problem to be Solved

There is nevertheless a need for thixotropy-increasing additives, especially in combination with a thixotropic agent such as amorphous and more particularly fumed silica, for example, which do not have the above disadvantages of the customarily employed thixotropy-increasing additives.

It is an object of the present invention, therefore, to provide a thixotropy-increasing additive which has advantages over the customarily employed thixotropy-increasing additives. More particularly it is an object of the present invention to provide compositions comprising at least one such thixotropy-increasing additive and also at least one thixotropic agent, these compositions having advantages over the customarily employed compositions, particularly in respect of the thixotropic effect of such compositions, which are used as adhesives, sealants, paints, or coating materials, more particularly as adhesives. More particularly it is an object of the present invention to provide a composition which, in particular on account of the thixotropy-increasing additive it comprises and also on account of the thixotropic agent it comprises is suitable for enhancing the mechanical properties of the compositions in the uncured, and in the cured, state, especially for increasing their stability.

DESCRIPTION OF THE INVENTION

The invention concerns a method for modifying the rheology of a casting resin and/or coating composition, comprising the following steps:
(i) providing a composition comprising at least one monomer capable of forming a casting resin and/or coating upon polymerisation; and
(ii) adding to said composition a working amount of a urea urethane as a thixotropic agent, said urea urethane being obtained according to the following steps:
(a) providing a monohydroxyl compound of formula (I)

R—OH (I)

in which R is n-alkyl or isoalkyl containing 4 to 22 carbon atoms, cycloalkyl containing 6 to 12 carbon atoms, aralkyl containing 7 to 12 carbon atoms or a radical of the formula $C_mH_{2m+1}(O-C_nH_{2n})_x-$ or $C_mH_{2m+1}(OOC-C_vH_{2v})_x-$, and m stands for an integer of from 1 to 22, n stands for an integer of 2 to 4, x for an integer of 1 to 15 and v means 4 or 5;
(b) providing a diisocyanate compound of formula (II)

OCN-[A]-NCO (II)

in which A stands for a linear or branched alkylene radical having 2 to 10 carbon atoms and/or a toluylene radical;
(c) reacting said monohydroxyl compound and said diisocyanate compound to form a prepolymer;
(d) reacting said pre-polymer with a diamine compound, said diamine compound being selected from the group consisting of
(d1) compound (II)

$H_2N$-[B]-$NH_2$ (III)

where B stands for a linear, branched and/or cyclic alkylene group having 2 to 12 carbon atoms; and/or
(d2) compound (IV)

$H_2N-(CH_2)_a$-Ph-$(CH_2)_bNH_2$ (IV)

in which a and b represent independent from each other integers from 1 to 5 and Ph stands for a phenyl radical, wherein said pre-polymer and said diamine are reacted in a molar ratio of 1:1.1 to 1:1.45.

It has surprisingly been found that with urea urethanes used in accordance with the invention, it is possible to achieve an increase in the thixotropic effect induced when taken alone.

More particular the thixotropic agents are liquid and applicable also in non-aqueous solvent-borne to 100% systems. They can be added at every production step and does not require special incorporation procedures (like organoclays, amides, castor oil derivatives than may require pre-gel preparation, grinding or temperature activation) other than sufficient mixing. The additives provide excellent structure to systems to prevent sedimentation of pigments and extenders on storage. They provide a thixotropic flow for excellent sag/levelling balance and strong shear thinning flow behaviour for improved application behaviour The urea urethanes have been found particularly useful when combined with another thixotropic agent, especially if the thixotropic agent is amorphous silica, such as fumed silica, for example, since in that case the presence of urea urethane leads to a strengthening of the silica network built up by the thixotropic agent in different binder systems.

Therefore in a specific embodiment the present invention also discloses a casting resin composition comprising or consisting of:
(a) a monomer capable of forming a casting resin upon polymerisation;
(b) a first thixotropic agent; and
(c) a second thixotropic agent, different from the first one, wherein said first thixotropic agent is a urea urethane and said second thixotropic agent is amorphous silica.

The urea urethanes used in accordance with the invention act as—increasing additives, especially in combination with at least one other thixotropic agent and optionally at least one binder. It has in particular been surprisingly found that by means of such strengthening of the silica network built up by the thixotropic agent, it is possible to prevent at least partial destruction of the network under moderate temperature increase and/or moderate mechanical loads.

It has further surprisingly been found that through use of the urea urethanes used in accordance with the invention as a thixotropy-increasing additive, it is possible to replace or at least significantly reduce the amount of other thixotropic agents that need be used in order to achieve at least the same thixotropic effect, thereby making it possible to reduce the incidence of adverse properties associated with a greater amount of additional thixotropic agent being used, such as, for example, unwanted matting effects in the case of lustrously formulated casted resins for coating systems or cables, or reduced strength in binders.

It has further surprisingly been found that through use of the urea urethanes used in accordance with the invention as a thixotropy-increasing additive, it is possible to exert a positive influence over the settling behaviour of any other additional the thixotropic agent especially if the thixotropic agent (B) is amorphous silica, such as fumed silica, for example.

It has further surprisingly been found that with the urea urethanes used in accordance with the invention, the thixotropic effect induced by any other thixotropic agent can be boosted, especially if compositions comprising these compounds and also at least one binder and optionally, moreover, at least one curing agent are provided that are used as adhesive or sealant, more particularly as adhesive, since at the same time it is possible, as a result, to increase the binding power of the cured adhesive or sealant and so to increase the mechanical stability of the adhesively bonded or sealed assembly. This is especially advantageous where such assemblies are used under high mechanical stress.

More particularly it has surprisingly been found that where the compositions of the invention are used as coatings they can be applied in layer thicknesses of several millimetres to centimetres to substrates. Especially where coatings are applied in such layer thicknesses, it is necessary to use casting resins distinguished by sufficiently high viscosity and/or low fluidity, in order to meet the requirements of overhead use or application to a vertical plane without running away.

Definitions

In the course of the present invention the following definitions shall apply:

"casting resin composition" shall mean any a composition comprising at least one monomer capable of forming a casting resin upon polymerisation. Particularly such casting composition is a coating composition. Therefore—if not otherwise indicated—the terms "casting composition" and "coating" or "coating composition" are used as synonyms and are exchangeable without creating a new disclosure. More particular, the phrase covers:

non-aqueous conventional solvent-borne to 100% clear and pigmented coating systems, like
alkyd top-coats and primers;
epoxy primer, top coats, floor coatings;
polyurethane top coats, floor coatings;
polyester baking systems;
non-aqueous conventional solvent-borne to 100% clear and pigmented casting resin, gelcoats, glass fibre reinforced ambient cured resin systems based on
polyurethanes
epoxides;
PMMA
polyesters, and
PVC plastisols "polymerisation" shall mean any process transforming the monomers in a casting resin composition into the casting resins (or polymers). This term shall have the same meaning as for example "curing" or "hardening" or "cross-linking".

"casting resin" shall mean any polymer obtained from the polymerisation of a casting resin composition. The term shall have the same meaning as "casted polymer".

The terms "thixotropy" and "thixotropic agent" are known to the skilled person and defined for example in Römpp Lexikon, Lacke and Druckfarben, Georg Thieme Verlag 1998 and in Römpp Chemie-Lexikon, Georg Thieme Verlag 1992.

Casting Compositions

A casting composition comprises certain monomers which are subjected to polymerisation (synonym: curing, hardening, cross-linking) to provide polymeric casted resins. Polymerisation can be induced by heat, UV radiation, catalyst or combinations of them. The process is well-known to any person skilled in polymer chemistry. Notwithstanding this fact, reference is made for example to OSSWALD ET AL (ed.) (2003). "Materials science of polymers for engineers". Hanser Verlag. pp. 334-335. ISBN 978-1-56990-348-3.

The monomers used in accordance with the invention preferably have cross-linkable functional groups. Any customary cross-linkable functional group known to the skilled person is contemplated here. More particularly the cross-linkable functional groups are selected from the group consisting of hydroxyl groups, amino groups, carboxylic acid groups, and unsaturated carbon double bonds, isocyanates, polyisocyanates, and epoxides such as ethylene oxides. The monomers are exothermically or endothermically crosslinkable or curable, preferably in a temperature range from $-20°$ C. C. up to $250°$ C. Preferably the monomers are crosslinkable at room temperature or at temperatures in the range from about 15 to about $80°$ C.

Monomers for Preparing Resins

According to the present invention said casting resin can be selected from the group consisting of polyester resins, polyurethane resins, epoxy resins, silicone resins, vinyl ester resins, phenol resins, acryl resins and their mixtures. Consequently the corresponding monomers are selected from the group consisting of esters, isocyanates, epoxides, silicones, vinyl compounds, phenols, (meth)acryl compounds and their mixtures.

For expoxide-based resins glycidyl ethers which have terminal epoxide groups and, within the molecule, hydroxyl groups as functional groups are preferred as monomers. These are preferably reaction products of Bisphenol A and epichlorohydrin or of Bisphenol F with epichlorohydrin, and mixtures thereof. The curing or crosslinking of such monomers is accomplished customarily through polymerization of the epoxide groups of the epoxide ring, through a polyaddition reaction in the form of an addition of other reactive compounds as curing agents in stoichiometric amounts onto the epoxide groups, in which case, accordingly, the presence of one active hydrogen equivalent per epoxide group is necessary (i.e., one Hactive equivalent is needed per epoxide equivalent for curing), or through a polycondensation via the epoxide groups and the hydroxyl groups. Examples of suitable curing agents are polyamines, more particularly (hetero)aliphatic, (hetero)aromatic, and (hetero)cycloaliphatic polyamines, polyamidoamines, polyaminoamides, and also polycarboxylic acids and their anhydrides. Suitable polyamines are all polyamines also used for preparing the reaction product, it being possible for this product to be used in turn as component for preparing the condensation product. Where polyamines are used as curing agents, those suitable as curing agents are, for example and in particular, the polyamines disclosed in EP 0 835 910 A1.

For polyester-based resins monomeric esters which are derived from polyols such as, for example, ethylene glycol or 1,4-butanediol and optionally at least monounsaturated dicarboxylic acids or dicarboxylic acid derivatives such as adipic acid and/or terephthalic acid are preferred. Polyester-based resins, especially unsaturated polyester-based resins, are customarily obtainable from various combinations of saturated and unsaturated dicarboxylic acids, dialcohols, and, optionally, suitable monomers. The reactivity of polyester-based resins is determined primarily by the number of reactive unsaturated C—C double bonds of the dicarboxylic acid used or of the dicarboxylic acid derivative used (e.g., maleic acid, maleic anhydride, and fumaric acid); a fraction of saturated dicarboxylic acids (e.g., orthophthalic acid, phthalic anhydride, isophthalic acid, etc.) may influence, for example, the solubility in styrene and also certain later mechanical properties of the end product. Examples of suitable curing agents for curing polyester-based resins, especially unsaturated polyester-based resins, are compounds which permit a radical polymerization as a curing reaction which is initiated, for example, by the decomposition of organic peroxides. The peroxides decompose by way of temperature or the presence of accelerators such as metallic salts, cobalt octoate for example. Since this is a radical polymerization, there is no need for stoichiometric provision of the polyester-based resins and the curing agent to be used; in other words, the curing component can be used in only small, preferably catalytic, amounts.

For vinyl ester-based resins monomers obtained from the reaction of an epoxide with at least one unsaturated monocarboxylic acid are preferred. Resins of these kinds are notable for the presence of at least one terminally positioned C—C double bond. The curing of such vinyl ester-based resins may take place through a radical polymerization, initiated for example by the decomposition of organic peroxides. The peroxides are decomposed via temperature or the presence of accelerators such as metallic salts, cobalt octoate for example. Since this is a radical polymerization, there is no need for stoichiometric provision of the vinyl ester-based resins and the curing agent to be used; in other words, the curing component can be used in only small, preferably catalytic, amounts.

For poly(meth)acrylate-based resins and/or resins based on at least one (meth)acrylate copolymer monomer mixtures or oligomer mixtures of esters of acrylic acid and of methacrylic acid are the preferred educts. Polymer build-up takes place via the reaction of the C—C double bonds of these monomers. The curing of such poly(meth)acrylate-based resins and/or resins based on at least one (meth)acrylate copolymer may take place through a radical polymerization, initiated for example by the decomposition of organic peroxides. The peroxides are decomposed via temperature or the presence of accelerators such as metallic salts, such as copper octoate, for example, or amines such as N,N-dimethyl-p-toluidine, for example. Since this is a radical polymerization, there is no need for stoichiometric provision of the poly(meth)acrylate-based resins and/or resins based on at least one (meth)acrylate copolymer and the curing agent to be used; in other words, the curing component (D) can be used in only small, preferably catalytic, amounts.

For polyurethane-based resins monomers are preferred obtained by a polyaddition reaction between hydroxyl-containing compounds such as polyols (such as, for example, hydroxyl groups of polyesters or hydroxyl-containing polyethers and also mixtures thereof) and at least one polyisocyanate (aromatic and aliphatic isocyanates or di- and polyisocyanates). Customarily this requires a stoichiometric reaction of the OH groups of the polyols with the NCO groups of the polyisocyanates. However, the stoichiometric ratio to be used can also be varied, since the polyisocyanate can be added to the polyol component in amounts such that there may be an "over-crosslinking" or an "under-crosslinking".

For a certain lacquer comprising one of the aforementioned resins cellulose nitrate represents a preferred solvent.

The casting compositions of the invention typically contain said monomers in an amount of about 20 to about 99 wt.-%, preferably in an amount of about 25 to about 95 wt. %, more preferably in an amount of about 30 to about 90 wt.-%. The remaining amounts are dedicated to the thixotropic agents and optionally to further additives, in particular curing agents.

Where the casting compositions of the invention comprise at least one curing agent, this agent is preferably suitable for crosslinking. Curing agents of this kind are known to the skilled person. To accelerate the crosslinking, suitable catalysts may be added to the composition. All customary curing agents known to the skilled person may be used for producing the composition of the invention.

The compositions of the invention preferably comprise the curing agents in an amount of about 1 to about 100 wt.-%, preferably in an amount of about 2 to about 80 wt. %, more preferably in an amount of about 5 to about 50 wt.-%, based in each case on the total weight of the monomers.

Thixotropic Agents

The composition according to the present invention may comprise said urea urethanes in an amount of from about 0.1 to about 20 wt.-%, preferably from about 0.5 to about 10 wt.-% and more preferably from about 1 to about 5 wt.-%.

As far as two thixotropic agents are present in the composition their ratio by weight may range from about 25:75 to about 75:25, more preferably about 40:60 to about 60:40. The most preferred ratio between urea urethanes and secondary thixotropic agents, particularly amorphous silica is about 50:50. In contrast to the silica obtained by wet-chemical means, which usually possess very high internal surface areas, amorphous silica obtained by flame hydrolysis consist of virtually spherical primary particles having particle diameters of typically 7 to 40 nm. The specific surface areas are preferably in a range from 50 to 400 m$^2$/g, preferably in a range from 50 to 380 m$^2$/g (Degussa Pigments text series, number 54). They have essentially only an external surface area. This surface is partly occupied by siloxane groups, partly by silanol groups. The high proportion of free silanol groups gives untreated fumed silica a hydrophilic character. The silanol groups are capable of reversible construction of a silica network via the development of hydrogen bonds, as a result of which there may be a thixotropic effect. It is also possible, however, although more expensive, to carry out organic after-treatment of the hydrophilic surface area of fumed silica, using, for example, silanes such as dimethyldichlorosilane, trimethoxyoctylsilane, or hexamethyldisilazane, in which case the major proportion of the silanol groups are saturated by organic groups and hence the hydrophilic silica is rendered hydrophobic. The fumed silica can therefore be present in the form of non-organically modified fumed silica (hydrophilic silica) or of hydrophobically modified fumed silica, or in the form of a mixture of these silica, particular preference being given to the non-organically modified fumed silica (hydrophilic silica).

Further Additives

The aforesaid compositions may comprise further additives such as for example emulsifiers, flow control assistants, solubilisers, defoaming agents, stabilizing agents, preferably heat stabilizers, process stabilizers, and UV and/or light stabilizers, catalysts, waxes, flexibilisers, flame retardants, solvents, reactive diluents, vehicle media, resins, adhesion promoters, organic and/or inorganic nanoparticles having a particle size <100 nm, such as carbon black, metal oxides and/or semimetal oxides, process aids, plasticizers, solids in powder and fibre form, preferably solids in powder and fibre form that are selected from the group consisting of fillers, glass fibre, reinforcing agents, and pigments, and mixtures of the aforesaid additives.

Urea Urethanes

Suitable monohydroxyl compounds for use as starting materials for the urea urethanes as disclosed above encompass linear or branched, aliphatic or aromatic alcohols having 4 to 22 and preferably 6 to 12 carbon atoms and their alkylene oxide adducts, preferably adducts of on average 1 to 20, and preferably 2 to 10 mol ethylene oxide, propylene oxide or their mixtures to one of the aforementioned alcohols. Particularly preferred are butanol (all isomers), pentanol, hexanol, heptanol, octanol, nonanol, decanol, undecanol, dodecanol, myristyl alcohol, stearyl alcohol, cetyl alcohol, oleyl alcohol, erucyl alcohol, behenyl alcohol, phenol, benzyl alcohol and their technical mixtures and adducts of 1 to 20 mol, preferably 2 to 10 mol ethylene oxide and/or 1 to 5, preferably 2 to 4 mol propylene oxide.

Particularly preferred, however, are alkyl polyalkylene glycol ethers, preferably alkyl polyethylene glycol ethers having a molecular weight of from about 200 to about 1,000 Dalton, as for example methyl ethers (MPEG) or butyl ethers (BPEG) of PEG100, PEG200, PEG300, PEG350 or PEG500.

While the diisocyanate compound can be of aliphatic origin, the preferred embodiments encompass aromatic or cycloaliphatic compounds or their mixtures, such as for example
  Methylendiphenylisocyanat (MDI)
  Toluoldiisocyanat (TDI)
  Hexamethylendiisocyanat (HDI)
  Isophorondiisocyanat (IPDI)
  4,4-Dicyclohexylmethandiisocyanat (H12MDI)

Particularly preferred is toluylene diisocyanate (also cited as toluol diisocyanate) which as available for example under the trademark Desmodur® (COVESTRO) in the market. With regard to the performance of the end product a toluylene diisocyanate encompassing about 50 to about 80 mol-% of the 2,4-isomer is particularly preferred.

Suitable diamine compounds encompass aliphatic, cycloaliphatic and aromatic diamines. A suitable diamine is for example

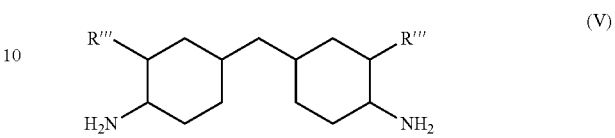

in which R''' stands for hydrogen or a methyl group. The preferred species, however, is xylene diamine.

In a particular preferred embodiment the urea urethanes of the present invention are obtained by reacting MPEG300, MPEG350, BPEG300 or BPEG350 with toluylene diisocyanate in a molar ration of from 1:1.2 to 1:1.4 to form a pre-polymer, which is subsequently reacted with xylene diamine to form the final product and is illustrated by the following formula:

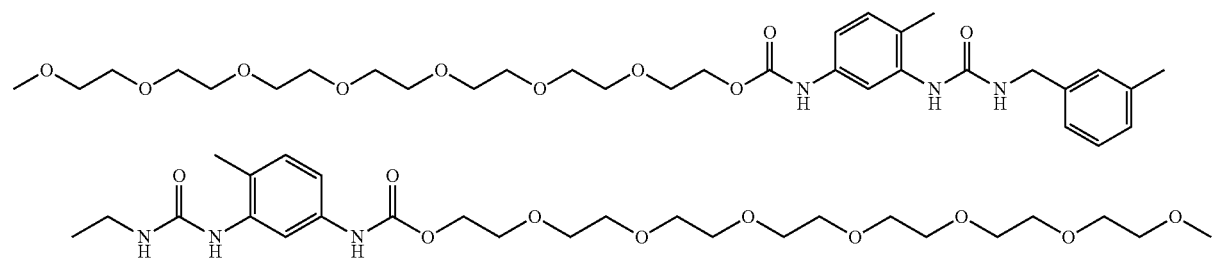

Reaction Step 1: Formation of the Pre-Polymer

Key to the present invention is the formation of the pre-polymer, according to which said monohydroxyl compounds and said diisocyanate compounds are reacted in a molar ratio of from about 1:1.00 to about 1:1.45, preferably from about 1:1.10 to about 1:1.40.

Depending on the excess of diisocyanate pre-polymers containing one or two polyether groups are obtained. A disubstituted pre-polymer does not offer a free reaction side for condensation with the amine group, remains as such in the final composition. Applicant, however, has recognized that the dissatisfying performance of the similar products from the market is linked to the amount of unreacted pre-polymers. By reducing the excess of diisocyanate the amount of pre-polymers available for further condensation with the diamine compound—as desired—is significantly increased. This does not only lead to products of improved performance, but also to a composition which is different from the market products and thus novel over the prior art.

Once the pre-polymer is formed it is advantageous removing the unreacted diisocyanate for example by distillation in vacuum. Preferably the remaining pre-polymers show a content of unreacted diisocyanate of less than 0.5% by weight, and preferably about 0.1 to 0.2% by weight.

The specific reaction conditions are illustrated by—but not limited to—the working examples.

Reaction Step 2: Formation of the Urea Urethane

Subsequently the pre-polymer thus obtained is reacted with a diamine compound, preferably in at least one solvent, preferably an aprotic solvent such as dimethyl formamide, dimethyl acetamide, N-methyl pyrrolidone or N-butyl pyrrolidone or similar alkyl pyrrolidones. Typically, the diamine compound—and optionally also the lithium salt—are dissolved in the solvent and placed into the reactor to which the pre-polymer is added. The preferred solvent is N-methyl pyrrolidone, since it is not listed under REACH.

The molar ratio between pre-polymer and diamine compound is adjusted to about 1:1.2 to 1.2:1.

The solids amount can adjusted in broad ranges of from about 5 to about 80% by weight, preferably about 20 to about 60% by weight, and more preferred about 40 to about 50% by weight. The amount to 100% is the solvent, optionally comprising small amounts of suitable additives as for example corrosion inhibitors.

The urea urethanes prepared according to the present invention do not contain either free isocyanate groups or free amino groups. They are accordingly physiologically safe. Furthermore, no adverse side reactions occur with binders or fillers. The storage stability of these urea urethane solutions prepared in this way is extraordinarily high and is certainly 6 months or more at, normal storage temperature.

Surfactants

In a preferred embodiment, the reaction of the pre-polymer and the diamine compound takes place in the presence of a surfactant. To avoid any ambiguity a surfactant is understood being any substance capable of lowering surface tension (or interfacial tension) between two liquids or between a liquid and a solid. Suitable surfactants according to the invention encompass, anionic, non-ionic, cationic, amphoteric and zwitterionic surfactants and of course their mixtures. Particular preferred are surfactants of anionic type and/or showing an HLB value in the range of 8 to 12.

Anionic Surfactants

Preferably, surfactants of the sulfonate type, alk(en)yl sulfonates, alkoxylated alk(en)yl sulfates, ester sulfonates and/or soaps are used as the anionic surfactants. Suitable surfactants of the sulfonate type are advantageously $C_{9-13}$ alkylbenzene sulfonates, olefin sulfonates, i.e. mixtures of alkene- and hydroxyalkane sulfonates, and disulfonates, as are obtained, for example, by the sulfonation with gaseous sulfur trioxide of $C_{12-18}$ monoolefins having a terminal or internal double bond and subsequent alkaline or acidic hydrolysis of the sulfonation products.

Alk(en)yl Sulfates.

Preferred alk(en)yl sulfates are the alkali and especially the sodium salts of the sulfuric acid half-esters of the $C_{12}$-$C_{18}$ fatty alcohols, for example, from coconut butter alcohol, tallow alcohol, lauryl, myristyl, cetyl or stearyl alcohol or from $C_8$-$C_{20}$ oxo alcohols and those half-esters of secondary alcohols of these chain lengths. Alk(en)yl sulfates of the cited chain lengths that comprise a synthetic straight chain alkyl group manufactured petrochemically are also preferred. The $C_{12}$-$C_{16}$ alkyl sulfates and $C_{12}$-$C_{15}$ alkyl sulfates as well as $C_{14}$-$C_{15}$ alkyl sulfates and $C_{14}$-$C_{16}$ alkyl sulfates are particularly preferred on the grounds of laundry performance. The 2,3-alkyl sulfates, which can be obtained from Shell Oil Company under the trade name DAN™, are also suitable anionic surfactants.

Alk(en)yl Ether Sulfates.

Sulfuric acid mono-esters derived from straight-chained or branched $C_7$-$C_{21}$ alcohols ethoxylated with 1 to 6 moles ethylene oxide are also suitable, such as 2-methyl-branched $C_9$-$C_{11}$ alcohols with an average of 3.5 mol ethylene oxide (EO) or $C_{12}$-$C_{18}$ fatty alcohols with 1 to 4 EO.

Ester Sulfonates.

The esters of alpha-sulfo fatty acids (ester sulfonates), e.g., the alpha-sulfonated methyl esters of hydrogenated coco-, palm nut- or tallow acids are likewise suitable.

Soaps.

Soaps, in particular, can be considered as further anionic surfactants. Saturated fatty acid soaps are particularly suitable, such as the salts of lauric acid, myristic acid, palmitic acid, stearic acid, hydrogenated erucic acid and behenic acid, and especially soap mixtures derived from natural fatty acids such as coconut oil fatty acid, palm kernel oil fatty acid or tallow fatty acid. Those soap mixtures are particularly preferred that are composed of 50 to 100 wt. % of saturated $C_{12}$-$C_{24}$ fatty acid soaps and 0 to 50 wt. % of oleic acid soap.

Ether Carboxylic Acids.

A further class of anionic surfactants is that of the ether carboxylic acids, obtainable by treating fatty alcohol ethoxylates with sodium chloroacetate in the presence of basic catalysts. They have the general formula:

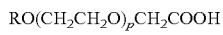
$$RO(CH_2CH_2O)_pCH_2COOH$$

with R=$C_1$-$C_{18}$ alkyl and p=0.1 to 20. Ether carboxylic acids are insensitive to water hardness and possess excellent surfactant properties.

Sulfosuccinates.

Overall preferred are anionic surfactants of the sulfosuccinate type. Sulfosuccinates represent sulfonation products of succinic acid mono and diesters having the general formula

$$R^1OOC—CH_2—CH(SO_3X)—COOR^2$$

With $R^1$=H, $C_1$-$C_{18}$ alkyl, $R^2$=$C_1$-$C_{18}$ alkyl and X=alkali, alkaline earth, ammonium or alkyl ammonium. The preferred sulfosuccinates represent mono or diesters of line are or branched alcohols having 6 to 12 and preferably 8 atoms, such as octanol or 2-ethylhexal alcohol. The structures may also incorporate polyalkylene glycol groups, such as for example 1 to 10 moles of ethylene oxide and/or propylene oxide. These structures (also called ether sulfosuccinates) are derived from the respective adducts of alkylene oxides to alcohols.

Nonionic Surfactants

Alkohol Alkoxylates.

The added nonionic surfactants are preferably alkoxylated and/or propoxylated, particularly primary alcohols having preferably 8 to 18 carbon atoms and an average of 1 to 12 mol ethylene oxide (EO) and/or 1 to 10 mol propylene oxide (PO) per mol alcohol. $C_8$-$C_{16}$-Alcohol alkoxylates, advantageously ethoxylated and/or propoxylated $C_{10}$-$C_{15}$-alcohol alkoxylates, particularly $C_{12}$-$C_{14}$ alcohol alkoxylates, with an ethoxylation degree between 2 and 10, preferably between 3 and 8, and/or a propoxylation degree between 1 and 6, preferably between 1.5 and 5, are particularly preferred. The cited degrees of ethoxylation and propoxylation constitute statistical average values that can be a whole or a fractional number for a specific product. Preferred alcohol ethoxylates and propoxylates have a narrowed homolog distribution (narrow range ethoxylates/propoxylates, NRE/NRP). In addition to these nonionic surfactants, fatty alcohols with more than 12 EO can also be used. Examples of these are (tallow) fatty alcohols with 14 EO, 16 EO, 20 EO, 25 EO, 30 EO or 40 EO.

Alkylglycosides (APG®).

Furthermore, as additional nonionic surfactants, alkyl glycosides that satisfy the general Formula RO(G), can be added, e.g., as compounds, particularly with anionic surfactants, in which R means a primary linear or methyl-branched, particularly 2-methyl-branched, aliphatic group containing 8 to 22, preferably 12 to 18 carbon atoms and G stands for a glycose unit containing 5 or 6 carbon atoms, preferably for glucose. The degree of oligomerization x, which defines the distribution of monoglycosides and oligoglycosides, is any number between 1 and 10, preferably between 1.1 and 1.4.

Fatty Acid Ester Alkoxylates.

Another class of preferred nonionic surfactants, which are used either as the sole nonionic surfactant or in combination with other nonionic surfactants, in particular, together with alkoxylated fatty alcohols and/or alkyl glycosides, are alkoxylated, preferably ethoxylated or ethoxylated and propoxylated fatty acid alkyl esters preferably containing 1 to 4 carbon atoms in the alkyl chain, more particularly the fatty acid methyl esters which are described, for example, in Japanese Patent Application JP-A58/217598 or which are preferably produced by the process described in International Patent Application WO-A-90/13533. Methyl esters of $C_{12}$-$C_{18}$ fatty acids containing an average of 3 to 15 EO, particularly containing an average of 5 to 12 EO, are particularly preferred.

Amine Oxides.

Nonionic surfactants of the amine oxide type, for example, N-coco alkyl-N,N-dimethylamine oxide and N-tallow alkyl-N,N-dihydroxyethylamine oxide, and the fatty acid alkanolamides may also be suitable. The quantity in which these nonionic surfactants are used is preferably no more than the quantity in which the ethoxylated fatty alcohols are used and, particularly no more than half that quantity.

Gemini Surfactants.

The so-called gemini surfactants can be considered as further surfactants. Generally speaking, such compounds are understood to mean compounds that have two hydrophilic groups and two hydrophobic groups per molecule. As a rule, these groups are separated from one another by a "spacer". The spacer is usually a hydrocarbon chain that is intended to be long enough such that the hydrophilic groups are a sufficient distance apart to be able to act independently of one another. These types of surfactants are generally characterized by an unusually low critical micelle concentration and the ability to strongly reduce the surface tension of water. In exceptional cases, however, not only dimeric but also trimeric surfactants are meant by the term gemini surfactants. Suitable gemini surfactants are, for example, sulfated hydroxy mixed ethers according to German Patent Application DE 4321022 A1 or dimer alcohol bis- and trimer alcohol tris sulfates and ether sulfates according to International Patent Application WO 96/23768 A1. Blocked end group dimeric and trimeric mixed ethers according to German Patent Application DE 19513391 A1 are especially characterized by their bifunctionality and multifunctionality. Gemini polyhydroxyfatty acid amides or polyhydroxyfatty acid amides, such as those described in International Patent Applications WO 95/19953 A1, WO 95/19954 A1 and WO 95/19955 A1 can also be used.

Cationic Surfactants

Tetraalkyl Ammonium Salts.

Cationically active surfactants comprise the hydrophobic high molecular group required for the surface activity in the cation by dissociation in aqueous solution. A group of important representatives of the cationic surfactants are the tetraalkyl ammonium salts of the general formula: $(R^1R^2R^3R^4N^+)$ $X^-$. Here R1 stands for $C_1$-$C_8$ alk(en)yl, $R^2$, $R^3$ and $R^4$, independently of each other, for alk(en)yl radicals having 1 to 22 carbon atoms. X is a counter ion, preferably selected from the group of the halides, alkyl sulfates and alkyl carbonates. Cationic surfactants, in which the nitrogen group is substituted with two long acyl groups and two short alk(en)yl groups, are particularly preferred.

Esterquats.

A further class of cationic surfactants particularly useful as co-surfactants for the present invention is represented by the so-called esterquats. Esterquats are generally understood to be quaternised fatty acid triethanolamine ester salts. These are known compounds which can be obtained by the relevant methods of preparative organic chemistry. Reference is made in this connection to International patent application WO 91/01295 A1, according to which triethanolamine is partly esterified with fatty acids in the presence of hypophosphorous acid, air is passed through the reaction mixture and the whole is then quaternised with dimethyl sulphate or ethylene oxide. In addition, German patent DE 4308794 C1 describes a process for the production of solid esterquats in which the quaternisation of triethanolamine esters is carried out in the presence of suitable dispersants, preferably fatty alcohols.

Typical examples of esterquats suitable for use in accordance with the invention are products of which the acyl component derives from monocarboxylic acids corresponding to formula RCOOH in which RCO is an acyl group containing 6 to 10 carbon atoms, and the amine component is triethanolamine (TEA). Examples of such monocarboxylic acids are caproic acid, caprylic acid, capric acid and technical mixtures thereof such as, for example, so-called head-fractionated fatty acid. Esterquats of which the acyl component derives from monocarboxylic acids containing 8 to 10 carbon atoms, are preferably used. Other esterquats are those of which the acyl component derives from dicarboxylic acids like malonic acid, succinic acid, maleic acid, fumaric acid, glutaric acid, sorbic acid, pimelic acid, azelaic acid, sebacic acid and/or dodecanedioic acid, but preferably adipic acid. Overall, esterquats of which the acyl component derives from mixtures of monocarboxylic acids containing 6 to 22 carbon atoms, and adipic acid are preferably used. The molar ratio of mono and dicarboxylic acids in the final esterquat may be in the range from 1:99 to 99:1 and is preferably in the range from 50:50 to 90:10 and more particularly in the range from 70:30 to 80:20. Besides the quaternised fatty acid triethanolamine ester salts, other suitable esterquats are quaternized ester salts of mono-/dicarboxylic acid mixtures with diethanolalkyamines or 1,2-dihydroxypropyl dialkylamines. The esterquats may be obtained both from fatty acids and from the corresponding triglycerides in admixture with the corresponding dicarboxylic acids. One such process, which is intended to be representative of the relevant prior art, is proposed in European patent EP 0750606 B1. To produce the quaternised esters, the mixtures of mono- and dicarboxylic acids and the triethanolamine—based on the available carboxyl functions—may be used in a molar ratio of 1.1:1 to 3:1. With the performance properties of the esterquats in mind, a ratio of 1.2:1 to 2.2:1 and preferably 1.5:1 to 1.9:1 has proved to be particularly advantageous. The preferred esterquats are technical mixtures of mono-, di- and triesters with an average degree of esterification of 1.5 to 1.9.

Amphoteric or Zwitterionic Surfactants

Betaines.

Amphoteric or ampholytic surfactants possess a plurality of functional groups that can ionize in aqueous solution and thereby—depending on the conditions of the medium—lend anionic or cationic character to the compounds (see DIN 53900, July 1972). Close to the isoelectric point (around pH 4), the amphoteric surfactants form inner salts, thus becoming poorly soluble or insoluble in water. Amphoteric surfactants are subdivided into ampholytes and betaines, the latter existing as zwitterions in solution. Ampholytes are amphoteric electrolytes, i.e. compounds that possess both acidic as well as basic hydrophilic groups and therefore behave as acids or as bases depending on the conditions. Especially betaines are known surfactants which are mainly produced by carboxyalkylation, preferably carboxymethylation, of amine compounds. The starting materials are preferably condensed with halocarboxylic acids or salts thereof, more particularly sodium chloroacetate, one mole of salt being formed per mole of betaine. The addition of unsaturated carboxylic acids, such as acrylic acid for example, is also possible. Examples of suitable betaines are the carboxy alkylation products of secondary and, in particular, tertiary amines which correspond to formula $R^1R^2R^3N$—$(CH_2)_qCOOX$ where $R^1$ is a an alkyl radical having 6 to 22 carbon atoms, $R^2$ is hydrogen or an alkyl group containing 1 to 4 carbon atoms, $R^3$ is an alkyl group containing 1 to 4 carbon atoms, q is a number of 1 to 6 and X is an alkali and/or alkaline earth metal or ammonium. Typical examples are the carboxymethylation products of hexylmethylamine, hexyldimethylamine, octyldimethylamine, decyldimethylamine, $C_{12/14}$-cocoalkyldimethylamine, myristyldimethylamine, cetyldimethylamine, stearyldimethylamine, stearylethylmethylamine, oleyldimethylamine, $C_{16/18}$-tallowalkyldimethylamine and their technical mixtures, and particularly dodecyl methylamine, dodecyl dimethylamine, dodecyl ethylmethylamine and technical mixtures thereof.

Alkylamido Betaines.

Other suitable betaines are the carboxyalkylation products of amidoamines corresponding to formula $R^1CO(R^3)(R^4)$—NH—$(CH_2)_p$—N—$(CH_2)_qCOOX$ in which $R^1CO$ is an aliphatic acyl radical having 6 to 22 carbon atoms and 0 or 1 to 3 double bonds, $R^2$ is hydrogen or an alkyl radical having 1 to 4 carbon atoms, $R^3$ is an alkyl radical having 1 to 4 carbon atoms, p is a number from 1 to 6, q is a number from 1 to 3 and X is an alkali and/or alkaline earth metal or ammonium. Typical examples are reaction products of fatty acids having 6 to 22 carbon atoms, like for example caproic acid, caprylic acid, caprinic acid, lauric acid, myristic acid, palmitic acid, palmoleic acid, stearic acid, isostearic acid, oleic acid, elaidic acid, petroselinic acid, linolic acid linoleic acid, elaeostearic acid, arachidonic acid, gadoleic acid, behenic acid, erucic acid and their technical mixtures with N,N-dimethylaminoethylamine, N,N-dimethylaminopropylamine, N,N-diethylaminoethylamine und N,N-diethylaminopropylamine, which are condensed with sodium chloroacetate. The commercially available products include Dehyton® K and Dehyton® PK (BASF) as well as Tego® Betaine (Goldschmidt).

Imidazolines.

Other suitable starting materials for the betaines to be used for the purposes of the invention are imidazolines. These substances are also known and may be obtained, for example, by cyclizing condensation of 1 or 2 moles of $C_6$-$C_{22}$ fatty acids with polyfunctional amines, such as for example aminoethyl ethanolamine (AEEA) or diethylenetriamine. The corresponding carboxyalkylation products are mixtures of different open-chain betaines. Typical examples are condensation products of the above-mentioned fatty acids with AEEA, preferably imidazolines based on lauric acid, which are subsequently betainised with sodium chloroacetate. The commercially available products include Dehyton® G (BASF).

The amount of surfactants is about 0.2 to about 2 mol, preferably about 0.5 to about 1.5 mol, particularly preferred about 0.75 to about 1.25 mol of surfactant, relative to the amine equivalent of the diamine used.

EXAMPLES

Preparation Examples

Example 1

Synthesis of Monoisocyanate with Polyethylene Glycol Monomethyl Ether.

A reactor is loaded with 208.8 gram of Desmodur® T80 (Toluene diisocyanate, 80% 2.4-isomer, 1.2 mol) and placed under a nitrogen blanket at 25° C. 350 gram of polyethylene glycol monomethyl ether (mw: 350 g/mol) is added dropwise to the mixture while stirring. The temperature did not exceed above 35° C. After completing the addition the reaction was followed on NCO content and stopped when the NCO content is in the correct range. The excess of TDI will be evaporated by vacuum and higher temperature. A slightly brown product was observed. The final NCO content is approximate 7.01% and the product has a viscosity of approximately 450 mPas. The final free TDI content is below 0.1%

Synthesis of polyurea based on monoisocyanate from Example 1. The reactor was loaded with 6.0 gram LiCl (1.2 wt.-%), 220.5 gram n-Butyl pyrrolidone (so called NBP) and 20.6 gram m-xylene diamine (4.12 wt.-%, based on NCO content) and the mixture is while stirring heated up to 100° C. All LiCl should be dissolved before addition of the monoadduct starts. A homogeneous mixture of 179.4 gram monoadduct obtained from step 1 and 73.50 gram NBP is added in approximate 1 hour. The NCO peak should be disappeared (follow by IR). The reaction mixture is stirred for at least 30 minutes. The reaction mixture is cooled down to room temperature when no NCO was found in IR. A clear low viscous product is observed.

Example 2

Synthesis of Mono Isocyanate with Polyethylene Glycol Monobutyl Ether.

A reactor is loaded with 208.8 gram of Desmodur® T80 (Toluene diisocyanate, 80% 2.4-isomer, 1.2 mol) and placed under a nitrogen blanket at 25° C. 382 gram of polyethylene glycol monobutylether (mw: 382 g/mol) is added dropwise to the mixture while stirring. The temperature did not exceed above 35° C. After completing the addition the reaction was followed on NCO content and stopped when the NCO content is in the correct range. The excess of TDI will be evaporated by vacuum and higher temperature. A slightly brown product was observed. The final NCO content is approximate 7.01% and the product has a viscosity of approximately 450 mPas. The final free TDI content is below 0.1%

Synthesis of Polyurea Based on Monoisocyanate from Example 2.

The reactor was loaded with 6.0 gram disodium dioctyl sulfosuccinate (1.2 wt.-%), 220.5 gram n-Butyl pyrrolidone (so called NBP) and 20.6 gram m-xylene diamine (4.12 wt %, based on NCO content) and the mixture is while stirring heated up to 100° C. All sulfosuccinate should be dissolved before addition of the monoadduct starts. A homogeneous mixture of 179.4 gram monoadduct obtained from step 1 and 73.50 gram NBP is added in approximate 1 hour. The NCO peak should be disappeared (follow by IR). The reaction mixture is stirred for at least 30 minutes. The reaction mixture is cooled down to room temperature when no NCO was found in IR. A clear low viscous product is observed.

Examples 3 and 4

Preparation of a Casting Resin Composition with Urea Urethanes 80 g of a mixture of a polyacrylic acid and methylmethacrylate (20:80) were placed in a beaker and subjected with 0.25 g curing agent (N,N-Di-(2-hydroxyethyl)-p-toluidine) and 19.75 g of the urea urethane according to Example 1 or Example 2 respectively. The mixture was subjected to vigorous stirring over a period of 10 minutes until homogenous syrup was obtained. The intermediate thus obtained was subjected with 0.75 g dibenzoylperoxide and stirred over another minute.

Examples 5 and 6

Preparation of a Casting Resin with Urea Urethane and Amorphous Silica 80 g of a mixture of a polyacrylic acid and methylmethacrylate (20:80) were placed in a beaker and subjected with 0.25 g curing agent (N,N-Di-(2-hydroxyethyl)-p-toluidine), 10.75 g of the urea urethane according to Example 1 or Example 2 respectively and 9 g amorphous silica. The mixture was subjected to vigorous stirring over a period of 10 minutes until homogenous syrup was obtained. The intermediate thus obtained was subjected with 0.75 g dibenzoylperoxide and stirred over another minute.

Comparative Example C1

Preparation of a Casting Resin Composition with PEI 80 g of a mixture of a polyacrylic acid and methylmethacrylate (20:80) were placed in a beaker and subjected with 0.25 g curing agent (N,N-Di-(2-hydroxyethyl)-p-toluidine) and 19.75 g of a linear polyethyleneimine hydrochloride (M=10.000) obtained from Sigma. The mixture was subjected to vigorous stirring over a period of 10 minutes until homogenous syrup was obtained. The intermediate thus obtained was subjected with 0.75 g dibenzoylperoxide and stirred over another minute.

Comparative Example C2

Preparation of a Casting Resin Composition with PEI and Amorphous Silica 80 g of a mixture of a polyacrylic acid and methylmethacrylate (20:80) were placed in a beaker and subjected with 0.25 g curing agent (N,N-Di-(2-hydroxyethyl)-p-toluidine), 10.75 g of a linear polyethyleneimine hydrochloride (M=10.000) obtained from Sigma and 9 g amorphous silica. The mixture was subjected to vigorous stirring over a period of 10 minutes until homogenous syrup was obtained. The intermediate thus obtained was subjected with 0.75 g dibenzoylperoxide and stirred over another minute.

Application Examples

Example 7

Preparation of a Nitrocellulose White Top-Coat with Urea Urethanes 198 g of a nitrocellulose coating without rheological additive were placed in a beaker and subjected with 2 g of the urea urethane according to Example 1 or Example 2 respectively. The mixture was subjected to vigorous stirring over a period of 10 minutes until homogenous material was obtained. The sample was stored for 24 h before evaluating its rheological behaviour.

The results for the flow behaviour are shown in FIG. 1. The urea urethane rheological additive according to Example 1 provided strong thixotropic flow behaviour to the nitrocellulose top-coat. This results in a significantly improved sag resistance with good levelling and flow properties.

The results for the amplitude sweep are shown in FIG. 2. The urea urethane rheological additive according to Example 1 provides a strong structure to the nitrocellulose top-coat, i.e. storage modulus G'. Although oscillatory amplitude sweep tests results are used to define the linear-viscoelastic-range (LVE-range) they give already an indication of the structure strength achieved with the example.

The results for the frequency sweep are shown in FIG. 3. Frequency sweep test results performed within the LVE range determined by amplitude sweep confirm the strong structure provided by Example 1. The higher G' vs G" at low frequencies indicate a good storage stability where the "solid-like" structure maintains pigments and extenders in suspension and protects the sample from sedimentation during storage and potentially transportation.

The results for oscillation recovery are shown in FIG. 4. Oscillation recovery (also called structure recovery) shown in tan (delta), (ratio of G"/G') confirm the more elastic structure of the coating sample with Example 1 at rest and the delayed recovery after shear. The test procedure was according to the following protocol: Oscillation to determine structure at rest (representative for behaviour at rest) followed by rotational measurement (represents application of the material) followed again by oscillation measurement to identify recovery of the material after application. The delayed structure recovery after shear indicates good levelling performance of the coating sample combined with good sag resistance. The more fast the recovery the better the sag resistance and the lower the levelling properties.

For the additive according to Example 2 a similar results were found.

Example 8

Preparation of a 2c Polyurethane Top-Coat with Urea Urethanes 198 g of a conventional polyol (component A) without rheological additive were placed in a beaker and subjected with 2 g of the urea urethane according to Example 1. The mixture was subjected to vigorous stirring over a period of 10 minutes until homogenous material was obtained. The sample was stored for 24 h before evaluating its rheological behaviour. Its flow behaviour is shown in FIG. 5. For the urea urethane according to Example 2 a similar result was found.

Example 9

Preparation of a 2c Polyurethane Clear-Coat with Urea Urethanes 198 g of a conventional polyol (component A) without rheological additive were placed in a beaker and subjected with 2 g of the urea urethane according to Example 1. The mixture was subjected to vigorous stirring over a period of 10 minutes until homogenous material was obtained. The sample was stored for 24 h before evaluating its rheological behaviour. Its flow behaviour is shown in FIG. 6. For the urea urethane according to Example 2 a similar result was found.

Example 10

Preparation of a Polyurethane Casting System with Urea Urethanes 198 g of a 100% solids polyol with extender (component A) and without rheological additive were placed in a beaker and subjected with 2 g of the urea urethane according to Example 1. The mixture was subjected to vigorous stirring over a period of 10 minutes until homogenous material was obtained. The sample was stored for 24 h before evaluating its rheological behaviour. Its flow behaviour is shown in FIG. 7. For the urea urethane according to Example 2 a similar result was found.

Figure 1:
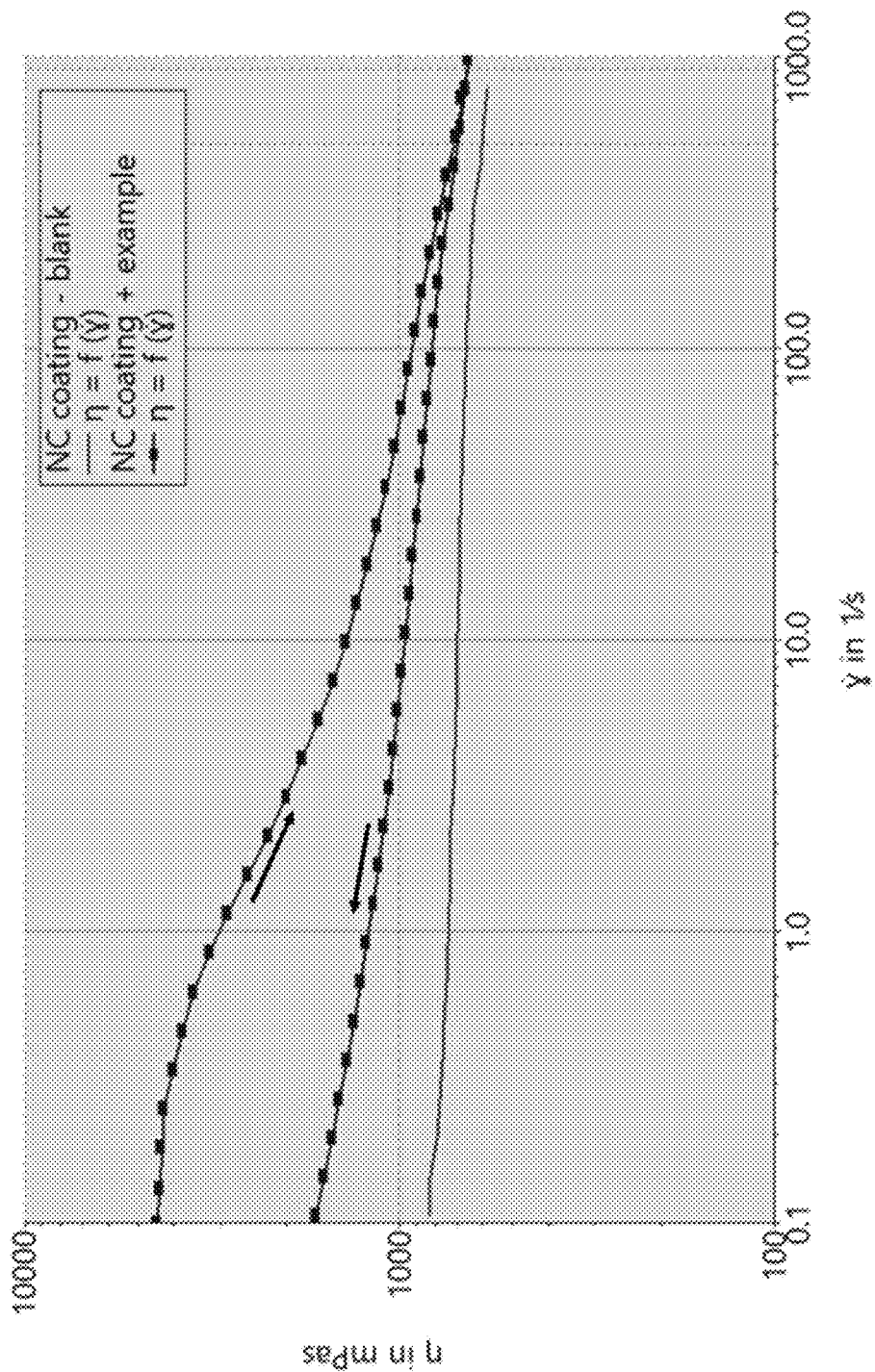
FIG. 1: Flow behaviour with 1% rheological additive for a nitrocellulose coating—white top-coat.
Figure 2:
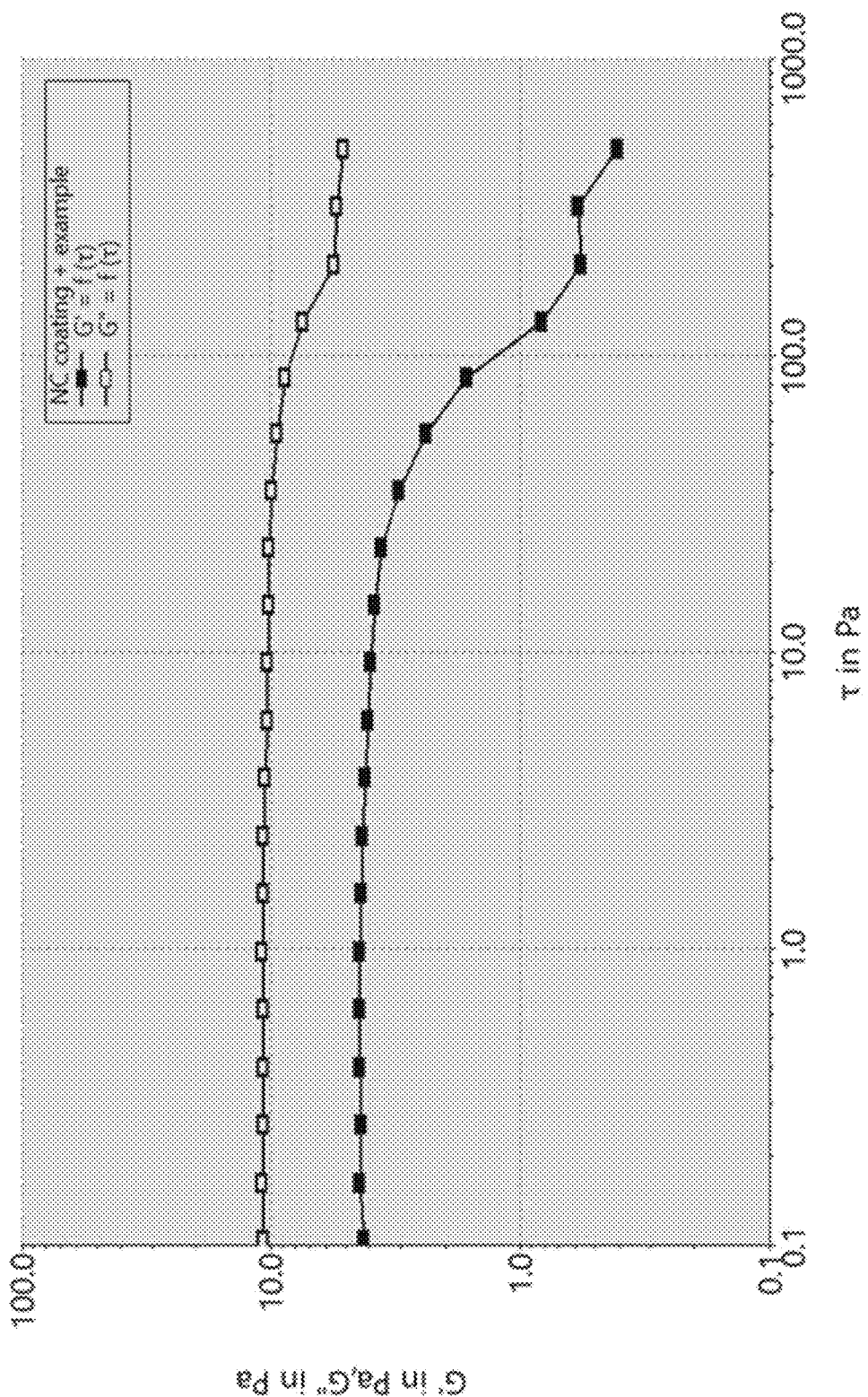
FIG. 2: Amplitude sweep with 1% rheological additive for a nitrocellulose coating—white top-coat.
Figure 3:
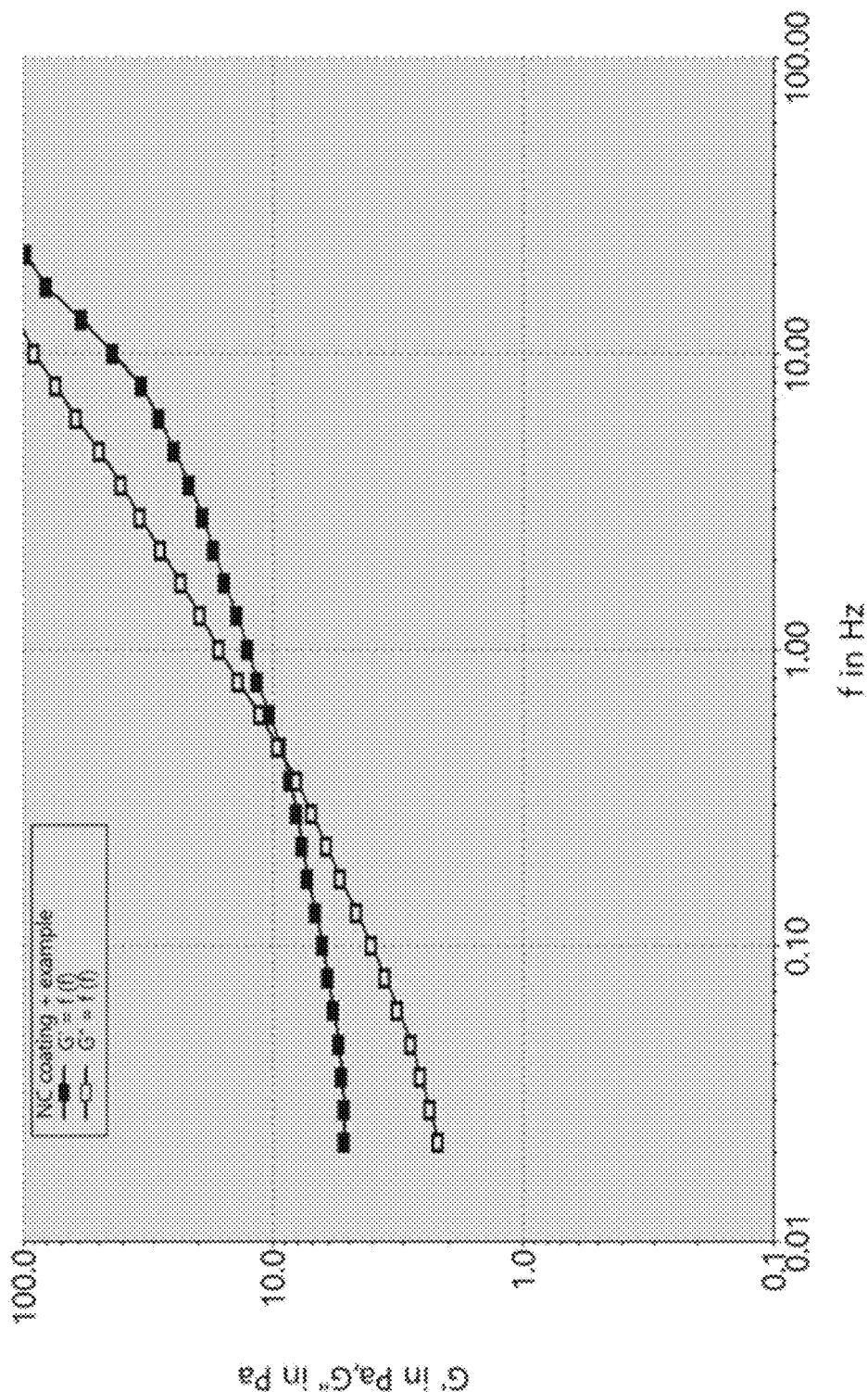
FIG. 3: Frequency sweep with 1% rheological additive for a nitrocellulose coating—white top-coat.
Figure 4:
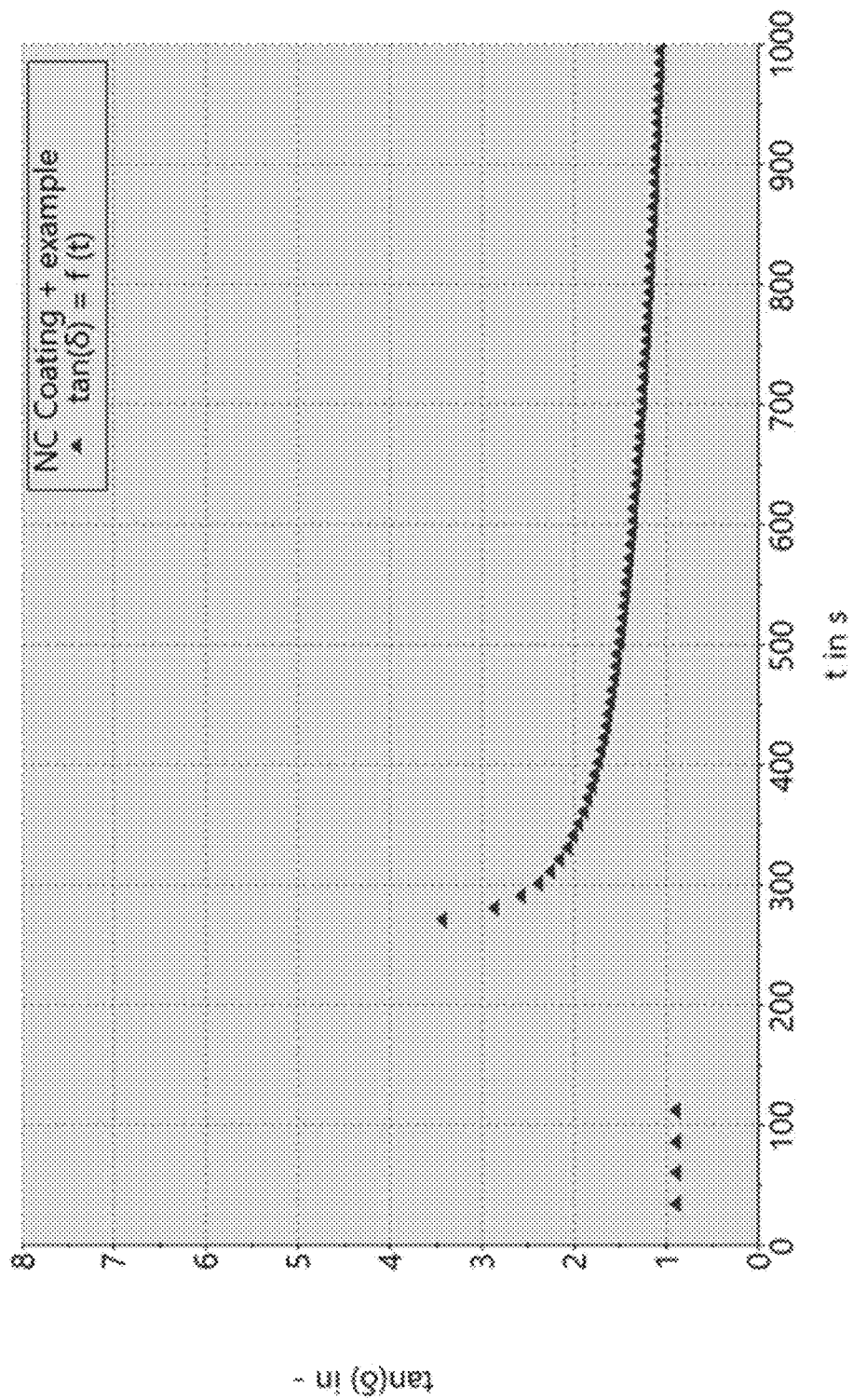
FIG. 4: Oscillation recovery with 1% rheological additive for a nitrocellulose coating—white top-coat.
Figure 5:
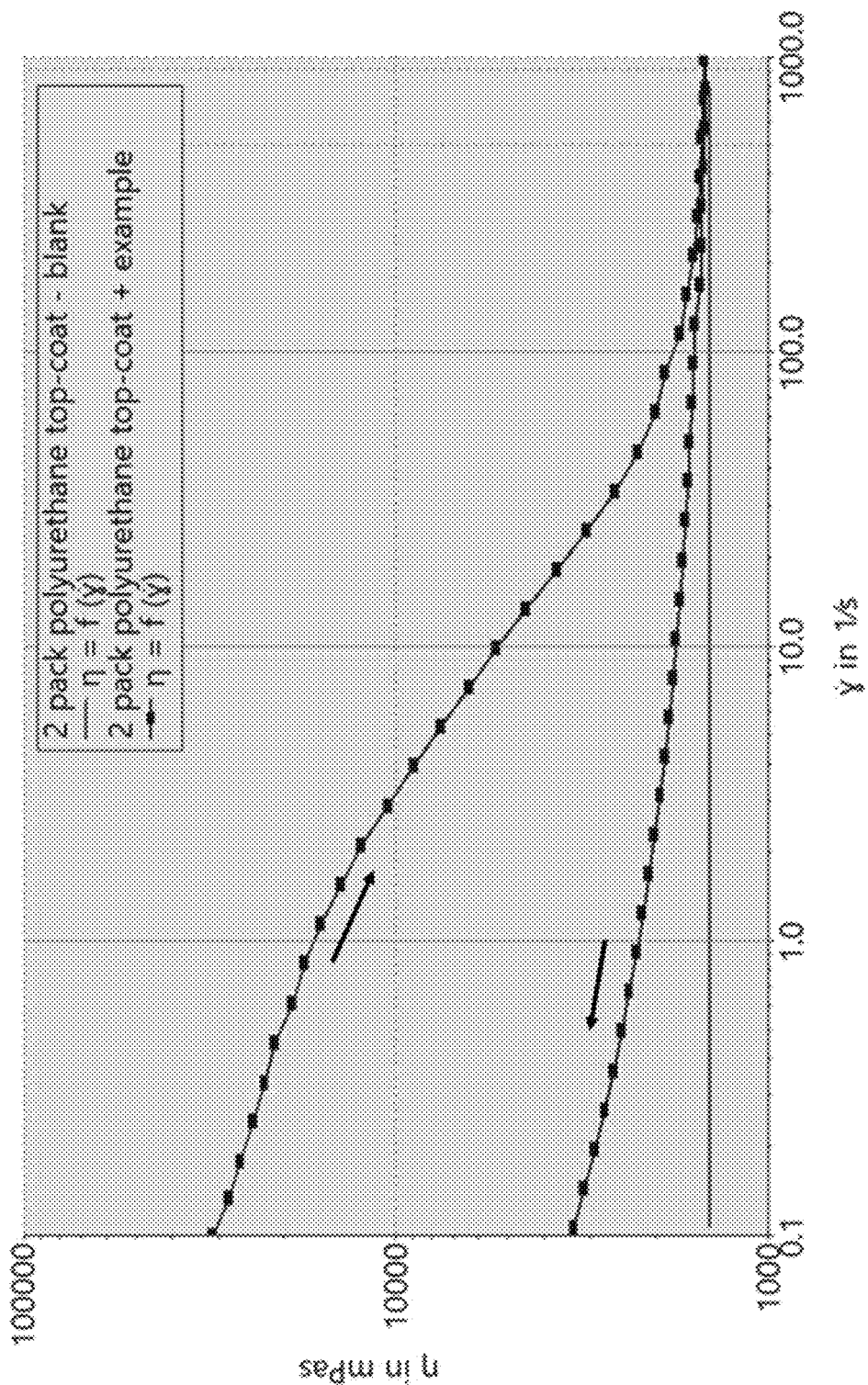
FIG. 5: Flow behaviour with 1% rheological additive for two component PU coating—white top coat
Figure 6:
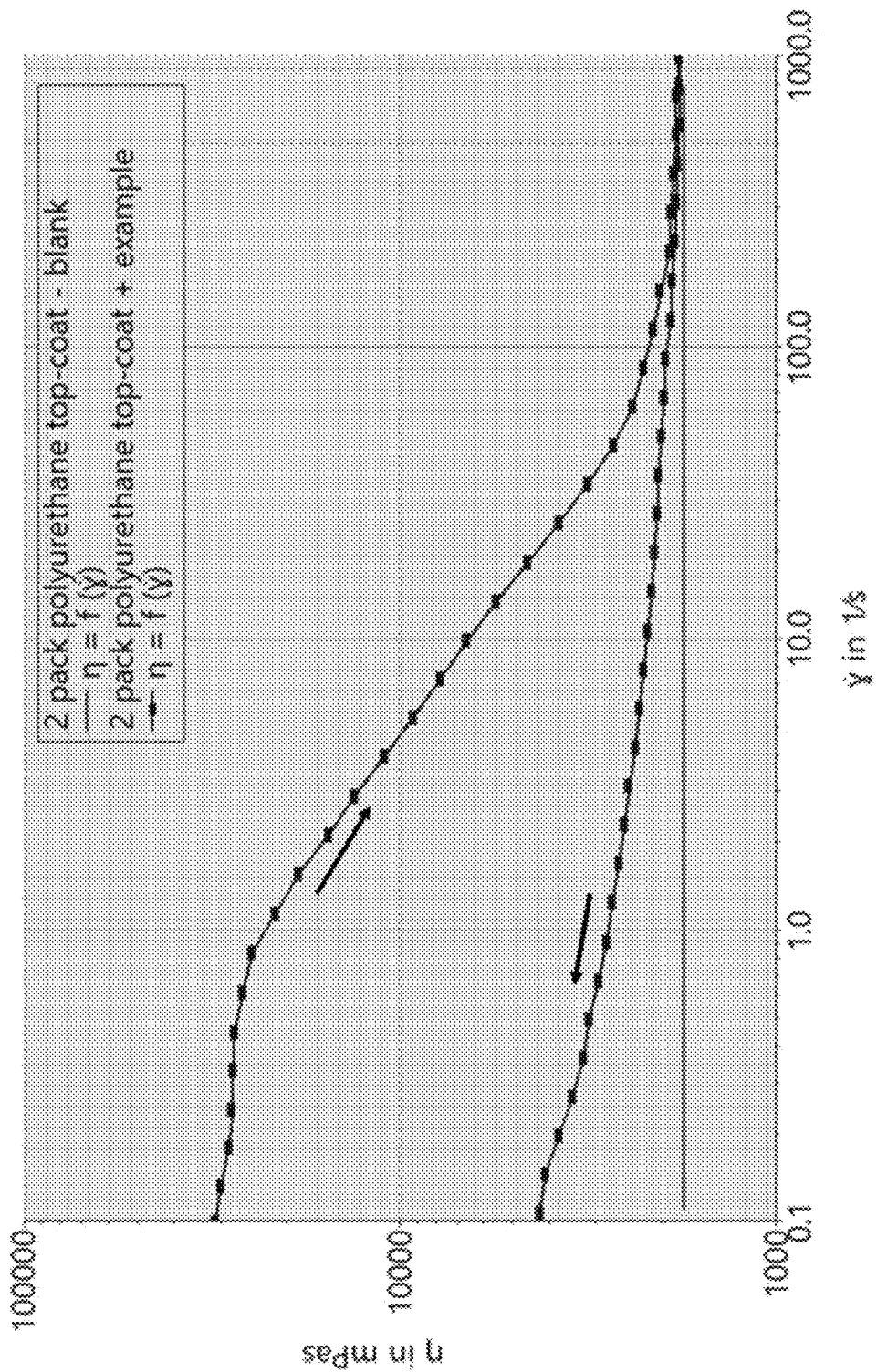
FIG. 6: Flow behaviour with 1% rheological additive for two component PU coating—clear-coat
Figure 7:
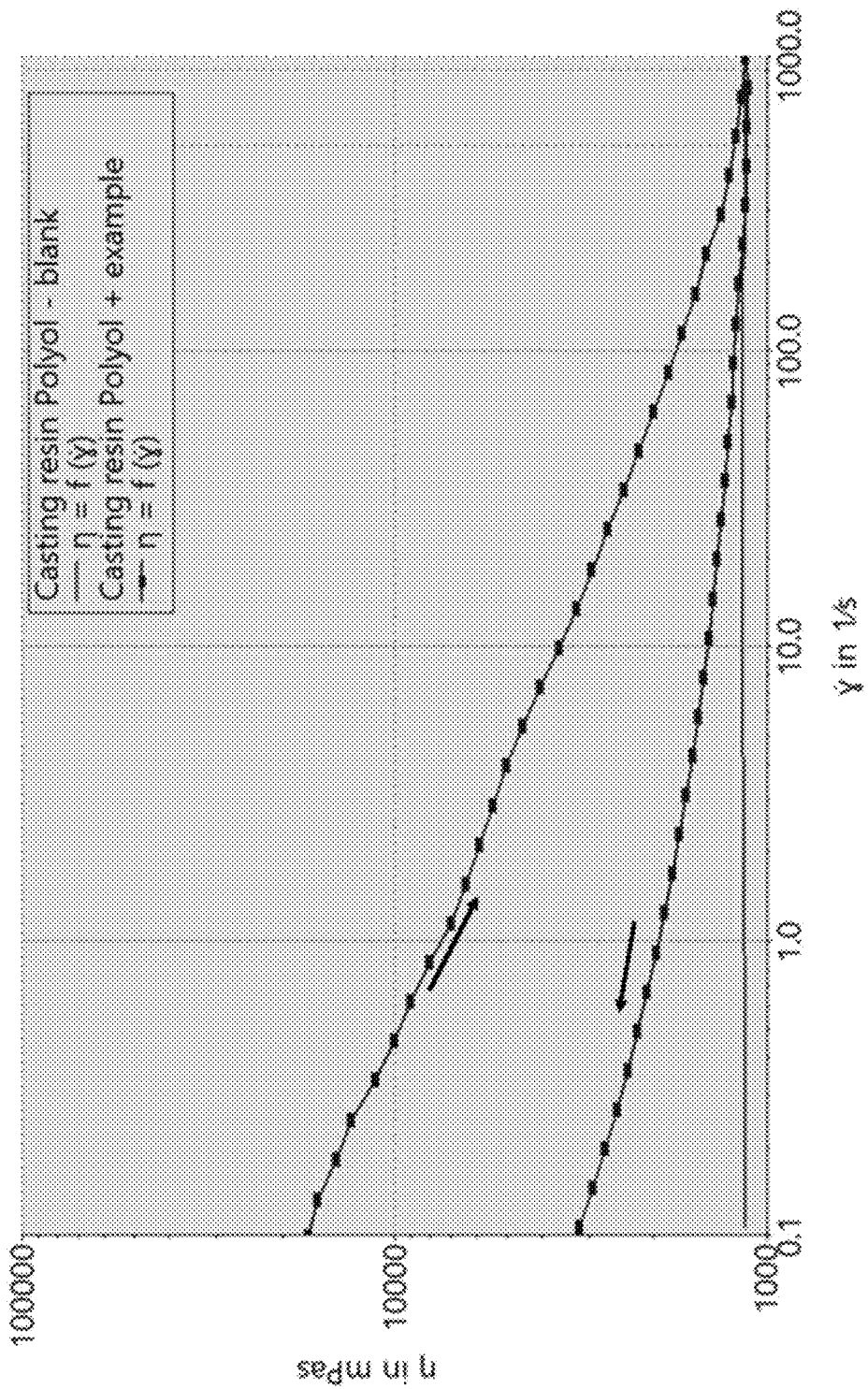
FIG. 7: Flow behaviour with 1% rheological additive for a polyol (filled) for casting applications

What is claimed is:

1. A method for modifying the rheology of a casting resin and/or coating composition, comprising the following steps:
   (i) providing a composition comprising at least one monomer capable of forming a casting resin and/or coating upon polymerisation; and
   (ii) adding to said composition a working amount of a urea urethane as a thixotropic agent,
   said urea urethane being obtained according to the following steps:
   (a) providing a monohydroxyl compound of formula (I)

R—OH   (I)

in which R is n-alkyl or isoalkyl containing 4 to 22 carbon atoms, cycloalkyl containing 6 to 12 carbon atoms, aralkyl containing 7 to 12 carbon atoms or a radical of the formula $C_mH_{2m+1}(O-C_nH_{2n})_x-$ or $C_mH_{2m+1}(OOC-C_vH_{2v})_x-$, and m stands for an integer of from 1 to 22, n stands for an integer of 2 to 4, x for an integer of 1 to 15 and v means 4 or 5;

(b) providing a diisocyanate compound of formula (II)

OCN-[A]-NCO   (II)

in which A stands for a linear or branched alkylene radical having 2 to 10 carbon atoms and/or a toluylene radical;
   (c) reacting said monohydroxyl compound and said diisocyanate compound to form a pre-polymer;
   (d) reacting said pre-polymer with a diamine compound, said diamine compound being selected from the group consisting of
   (d1) compound (II)

$H_2N$-[B]-$NH_2$   (III)

where B stands for a linear, branched and/or cyclic alkylene group having 2 to 12 carbon atoms; and/or
   (d2) compound (IV)

$H_2N-(CH_2)_a$-Ph-$(CH_2)_b NH_2$   (IV)

in which a and b represent independent from each other integers from 1 to 5 and Ph stands for a phenyl radical,
   wherein said pre-polymer and said diamine are reacted in a molar ratio of 1:1.1 to 1:1.45.

2. The method according to claim 1, comprising forming said casting resin into a product selected from the group consisting of transformers, isolators, capacitors, semiconductors, cables, muffles, prototypes and coatings and mixtures thereof.

3. The method according to claim 2 wherein said casting resin is formed into a coating.

4. The method of claim 1, wherein said monomer is selected from the group consisting of esters, isocyanates, epoxides, silicones vinyl compounds, phenols, (meth)acryl compounds and mixtures thereof.

5. The method of claim 1, wherein said urea urethane is derived from a monohydroxyl compound which is an alkyl polyalkylene glycol ether having a molecular weight of from about 200 to about 1,000 Dalton.

6. The method of claim 1, wherein said urea urethane is derived from a diisocyanate compound which is toluylene diisocyanate.

7. The method of claim 1, wherein said urea urethane is obtained by reacting said monohydroxyl compound and said diisocyanate compound in a molar ratio of from 1:1.05 to 1:6.

8. The method of claim 1, wherein said urea urethane is derived from a diamine compound which is xylene diamine.

9. The method of claim 1, wherein said urea urethane is added to said at least one monomer in an amount of from about 0.1 to about 20 wt.-percent.

10. The method of claim 1, wherein at least one further additive is added, said additive being selected from the group consisting of curing agents, emulsifiers, flow control assistants, solubilisers, defoaming agents, stabilizing agents, preferably heat stabilizers, process stabilizers, and UV and/or light stabilizers, catalysts, waxes, flexibilisers, flame retardants, solvents, reactive diluents, vehicle media, resins, adhesion promoters, organic and/or inorganic nanoparticles having a particle size <100 nm, process aids, plasticizers, solids in powder and fibre form and mixtures thereof.

11. The method of claim 1, comprising the additional step of
   (iii) adding a second thixotropic agent different from the first thixotropic agent, wherein said second thixotropic agent is amorphous silica, and the two thixotropic agents are present in a ratio by weight from about 25:75 to about 75:25.

12. The method of claim 11, wherein said pre-polymer and said diamine are reacted in a molar ratio of 1:1.1 to 1:1.4.

13. The method of claim 1, wherein said pre-polymer and said diamine are reacted in a molar ratio of 1:1.1 to 1:1.4.

* * * * *